US 7,655,721 B2

(12) United States Patent
Watanabe et al.

(10) Patent No.: US 7,655,721 B2
(45) Date of Patent: Feb. 2, 2010

(54) METHOD FOR PRODUCING A PROPYLENE-BASED RESIN COMPOSITION, A PROPYLENE-BASED RESIN COMPOSITION, AND AN INJECTION MOLDED ARTICLE

(75) Inventors: Tsuyoshi Watanabe, Ichihara (JP); Takashi Sanada, Ichihara (JP); Jun Satoh, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 364 days.

(21) Appl. No.: 11/205,173

(22) Filed: Aug. 17, 2005

(65) Prior Publication Data

US 2006/0052544 A1 Mar. 9, 2006

(30) Foreign Application Priority Data

Aug. 19, 2004 (JP) .............................. 2004-239351

(51) Int. Cl.
*C08L 53/00* (2006.01)

(52) U.S. Cl. .................. 524/505; 524/525; 524/528; 524/423; 524/451; 523/351

(58) Field of Classification Search ................. 523/351; 524/525, 528, 423, 451, 505
See application file for complete search history.

(56) References Cited

U.S. PATENT DOCUMENTS

| 4,997,871 | A | | 3/1991 | Ueno et al. |
| 5,082,646 | A | | 1/1992 | Ueno et al. |
| 5,283,267 | A | * | 2/1994 | Nishio et al. ................. 523/216 |
| 6,384,122 | B1 | * | 5/2002 | Hirakawa et al. ........... 524/451 |
| 6,403,691 | B1 | * | 6/2002 | Zanka et al. ................. 524/451 |
| 6,660,797 | B1 | * | 12/2003 | Banno et al. ................. 524/505 |

FOREIGN PATENT DOCUMENTS

| JP | 61-69848 A | 4/1986 |
| JP | 61-72039 A | 4/1986 |
| JP | 01-257126 A | 10/1989 |
| JP | 05-279526 A | 10/1993 |
| JP | 08-41257 A | 2/1996 |
| JP | 08-259750 A | 10/1996 |
| JP | 09-111065 A | 4/1997 |
| JP | 10-36586 A | 2/1998 |
| JP | 10-265630 A | 10/1998 |
| JP | 2000-127152 A | 5/2000 |

* cited by examiner

*Primary Examiner*—Peter D Mulcahy
(74) *Attorney, Agent, or Firm*—Sughrue Mion, PLLC

(57) ABSTRACT

Disclosed is a method for producing a propylene-based resin composition comprising: a first step of producing a first resin composition (MB) by melt-kneading a first-propylene polymer (A-I) and a fibrous inorganic filler (B) in a weight ratio of (A-I) to (B) of from 3/7 to 7/3; and a second step of producing a second resin composition by adding a second propylene polymer (A-II), a non-fibrous inorganic filler (C) and an elastomer (D) selected from the group consisting of olefin-based elastomer and vinyl aromatic compound-containing elastomer to the first resin composition (MB), followed by melt-kneading them.

7 Claims, No Drawings

METHOD FOR PRODUCING A PROPYLENE-BASED RESIN COMPOSITION, A PROPYLENE-BASED RESIN COMPOSITION, AND AN INJECTION MOLDED ARTICLE

BACKGROUND OF THE INVENTION

1. Technical Field

The present invention relates to a method for producing a propylene-based resin composition, to a propylene-based resin composition produced by the method, and to an injection molded article comprising the composition. More particularly, the invention relates to a method for producing a propylene-based resin composition which is superior in balance between rigidity and impact resistance and from which a molded article with good appearance is produced, to a propylene-based resin composition produced by the method, and to an injection molded article comprising the composition.

2. Description of the Related Art

Propylene-based resins have conventionally been used as materials for automobiles because they are superior in rigidity and impact resistance.

For example, JP-A61-69848 discloses a polypropylene resin composition containing a polypropylene resin, a fibrous filler and talc as a polypropylene resin composition which is a material suitable for the automotive and electrical fields and which can afford molded articles which have high impact strength, high heat-resistant rigidity and good surface appearance and cause little warp and deformation. It also discloses that the polypropylene resin composition can be obtained by kneading the ingredients fully uniformly by, for example, a method comprising a combination of dry blending and melt blending, a multi-stage melt-blending method or a simple melt-blending method.

JP-A 5-279526 discloses a polyolefin resin composition comprising a polypropylene resin, a fibrous filler and talc, which is light weight while maintaining characteristics inherent to filled polyolefin, namely, rigidity, heat resistance and coefficient of linear expansion and which can be used suitably as a molding material of automotive interior components. It also discloses, as a method for producing the resin composition, a method comprising feeding a polypropylene resin and talc quantitatively into a twin screw extruder through a hopper, followed by melt-kneading the resin and talc, feeding a fibrous filler quantitatively to a downstream portion of the twin screw extruder, and subsequently kneading the resulting mixture. It also discloses a polyolefin resin composition resulting from addition of an elastomer to the aforesaid resin composition.

JP-A 10-36586 discloses a polypropylene resin composition comprising a polypropylene resin, an ethylene-α-olefin copolymer, talc and a fibrous inorganic filler, which is superior in both rigidity and impact resistance as well as in surface appearance, dimension accuracy and moldability and which can be used suitably for automotive interior or exterior components. It also discloses, as a method for producing the polypropylene resin composition, a method comprising feeding a polypropylene resin, an ethylene-α-olefin copolymer and talc quantitatively into a twin screw extruder through a hopper, followed by melt-kneading them, feeding a fibrous inorganic filler quantitatively to a downstream portion of the twin screw extruder, and subsequently kneading the resulting mixture.

SUMMARY OF THE INVENTION

Even the propylene-based resin compositions disclosed in those published patent applications have been demanded for further improvement in balance between rigidity and impact resistance and in appearance of molded articles produced therefrom.

Under such circumstances, the object of the present invention is to provide a method for producing a propylene-based resin composition which is superior in balance between rigidity and impact resistance and from which molded articles with good appearance can be produced.

The present invention provides, in its first aspect, a method for producing a propylene-based resin composition comprising:

a first step of producing a first resin composition (MB) by melt-kneading a first propylene polymer (A-I) and a fibrous inorganic filler (B) in a weight ratio of (A-I) to (B) of from 3/7 to 7/3; and a second step of producing a second resin composition by adding a second propylene polymer (A-II), a non-fibrous inorganic filler (C) and an elastomer (D) selected from the group consisting of olefin-based elastomer and vinyl aromatic compound-containing elastomer to the first resin composition (MB), followed by melt-kneading them.

The present invention also provides, in its second aspect, a propylene-based resin composition obtained by the method according to the present invention.

The present invention also provides, in its third aspect, an injection molded article made of the propylene-based resin composition according to the present invention.

According to the present invention, it is possible to produce a propylene-based resin composition which is superior in balance between rigidity and impact resistance and from which molded articles with good appearance can be produced. In addition, by subjecting the propylene-based resin composition to injection molding, it is possible to obtain injection molded articles with good appearance.

DESCRIPTION OF THE PREFERRED EMBODIMENTS

The first propylene polymer (A-I) to be used in the first step refers to a propylene-ethylene block copolymer and a propylene homopolymer. The first propylene polymer (A-I) is preferably a propylene homopolymer.

Like the first propylene polymer (A-I), the second propylene polymer (A-II) to be used in the second step also refers to a propylene-ethylene block copolymer and a propylene homopolymer. The second propylene polymer (A-II) may be either the same as or different from the first propylene polymer (A-I). Preferred as the second propylene polymer (A-II) is a propylene-ethylene block copolymer.

The propylene-ethylene block copolymer as the first propylene polymer (A-I) or the second propylene polymer (A-II) is a copolymer composed of a first segment which is a propylene homopolymer portion and a second segment which is a propylene-ethylene random copolymer portion.

The proportion of the first segment (propylene homopolymer portion) in the propylene-ethylene block copolymer is preferably from 60 to 95% by weight, and more preferably from 65 to 90% by weight. In other words, the proportion of the second segment in the propylene-ethylene block copolymer is preferably from 5 to 40% by weight, and more preferably from 10 to 35% by weight. It should be noted that the percentages referred to above are each based on the weight of the propylene-ethylene block copolymer, namely the combined weight of the first and second segments.

The molecular weight distribution of the first segment (propylene homopolymer portion) in the propylene-ethylene block copolymer is represented by a Q value, which is a ratio of the number average molecular weight (Mn) to the weight average molecular weight (Mw), that is, Mw/Mn. The Q value is normally from 3 to 5 and preferably from 3.5 to 4.5 from the viewpoints of fluidity and balance between rigidity and impact resistance.

The isotactic pentad fraction of the first segment in the propylene-ethylene block copolymer is normally 0.97 or more, and preferably 0.98 or more from the viewpoints of rigidity and heat resistance. The isotactic pentad fraction is 1 or less.

The ethylene content, (C2')EP, of the second segment in the propylene-ethylene block copolymer is normally from 25 to 60% by weight, preferably from 30 to 55% by weight from the viewpoint of impact resistance, provided that the amount of the second segment is let be 100% by weight.

The intrinsic viscosity, $[\eta]$EP, of the second segment is normally from 1 to 9 dl/g and preferably from 2 to 9 dl/g from the viewpoints of balance between rigidity and impact resistance, generation of hard spots and surface quality.

The melt flow rate (hereinafter, abbreviated as MFR), measured at a temperature of 230° C. and a load of 2.16 kgf, of the propylene-ethylene block copolymer is normally not less than 0.3 g/10 min and preferably not lower than 10 g/10 min. The MFR of the propylene-ethylene block copolymer is normally not more than 150 g/10 min.

The propylene-ethylene block copolymer may be prepared, for example, by producing the propylene homopolymer portion, which is the first segment, in a first step and then producing the propylene-ethylene random copolymer portion, which is the second segment, in a second step.

For the preparation of the propylene-ethylene block copolymer, known polymerization methods using known polymerization catalysts may be employed. The known polymerization catalysts include Ziegler catalysts and metallocene catalysts. The known polymerization methods include e.g. slurry polymerization, bulk polymeriazation and gas phase polymerization.

The Q value of the propylene homopolymer as the first propylene polymer (A-I) or the second propylene polymer (A-II) is normally from 3 to 5, and preferably from 3.5 to 4.5. The isotactic pentad fraction of the propylene homopolymer is normally 0.97 or more, and preferably 0.98 or more. The isotactic pentad fraction is 1 or less.

The MFR, measured at a temperature of 230° C. and a load of 2.16 kgf, of the propylene homopolymer as the first propylene polymer (A-I) or the second propylene polymer (A-II) is normally not less than 0.3 g/10 min, preferably not less than 0.5 g/10 min and more preferably not less than 15 g/10 min. The MFR of the propylene homopolymer is normally not more than 500 g/10 min.

From the viewpoint of prevention of breakage of the fibrous inorganic filler (B) during the melt kneading, the first propylene polymer (A-I) used in the first step is preferably in the form of pellets or powder, preferably in the form of powder.

The fibrous inorganic filler (B) preferably has an average fiber length of 5 μm or more. The aspect ratio thereof is preferably 10 or more.

The fibrous inorganic filler (B) preferably has an average fiber diameter of from 0.2 to 1.5 μm, an average fiber length of from 5 to 20 μm, and an aspect ratio of from 10 to 30. These values are determined through electron microscopic observation.

From the viewpoints of enhancement of the effect of improving rigidity or improvement in appearance of molded articles, the fibrous inorganic filler (B) more preferably has an average fiber diameter of from 0.3 to 1.0 μm, an average fiber length of from 7 to 15 μm, and an aspect ratio of from 12 to 25.

Examples of the fibrous inorganic filler (B) include fibrous magnesium oxisulfate, fibrous potassium titanate, fibrous magnesium hydroxide, fibrous aluminum borate, fibrous calcium silicate, fibrous calcium carbonate, carbon fiber, glass fiber and metal fiber. Fibrous magnesium oxisulfate and fibrous calcium silicate are more preferable. Fibrous magnesium oxisulfate is the most preferable.

The fibrous inorganic filler (B) may be used without receiving any treatment. Alternatively, it may be used after being treated on its surface with a variety of known silane coupling agents or metal salts of higher fatty acids in order to improve the interfacial adhesiveness to or dispersibility in propylene polymers. The metal salts of higher fatty acids include calcium stearate, magnesium stearate and zinc stearate.

The fibrous inorganic filler (B) may form an aggregate in any form such as a powder, a flake and a granule. Preferably, a granular aggregate is used because of its easiness in handling.

The material of the non-fibrous inorganic filler (C) to be used in the second step includes talc, mica, calcium carbonate, barium sulfate, magnesium carbonate, clay, alumina, silica, calcium sulfate, siliceous sand, carbon black, titanium oxide, magnesium hydroxide, zeolite, molybdenum, diatomaceous earth, sericite, shirasu (light gray volcanic ash), calcium hydroxide, calcium sulfite, sodium sulfate, bentonite and graphite. From the viewpoint of obtaining impact strength, luster or good appearance of molded articles, talc is preferred.

The average particle diameter of the non-fibrous inorganic filler (C) is normally not more than 10 μm and preferably not more than 5 μm. By the average particle diameter of the non-fibrous inorganic filler (C) is meant a 50% equivalent particle diameter $D_{50}$ calculated from an integrated distribution curve by the minus sieve method measured by suspending the filler in a dispersion medium such as water, alcohol, or the like using a centrifugal sedimentation particle size distribution analyzer. The average particle diameter of the non-fibrous inorganic filler (C) is normally not less than 0.2 μm and preferably not less than 0.5 μm.

The non-fibrous inorganic filler (C) may be used without receiving any treatment. Alternatively, it may be used after being treated on its surface with a variety of known silane coupling agents, titanium coupling agents or surfactants in order to improve the interfacial adhesiveness to or dispersibility in propylene polymers. The surfactants include higher fatty acids, higher fatty acid esters, higher fatty acid amides and higher fatty acid salts.

The elastomer (D) to be used in the second step is an elastomer selected from the group consisting of olefin-based elastomer and vinyl aromatic compound-containing elastomer.

The olefin-based elastomer as the elastomer (D) refers to a copolymer elastomer composed of ethylene and at least one kind of α-olefin having from 4 to 20 carbon atoms. The α-olefin having from 4 to 20 carbon atoms includes 1-butene, isobutene, 1-pentene, 2-methyl-1-butene, 3-methyl-1-butene, 1-hexene, 2-methyl-1-pentene, 3-methyl-1-pentene, 4-methyl-1-pentene, 1-octene, 1-nonene, 1-decene, 1-undecene and 1-dodecene. Preferred are 1-butene, 1-hexene and 1-octene.

The density of the olefin-based elastomer is normally from 0.85 to 0.885 g/cm$^3$, preferably from 0.85 to 0.88 g/cm$^3$ and more preferably from 0.855 to 0.875 g/cm$^3$, from the viewpoints of the dispersibility of the olefin-based elastomer in the propylene polymers (A-I), (A-II) and the impact strength of a resulting resin composition at room temperature or low temperatures.

The MFR, measured at a temperature of 190° C. under a load of 2.16 kgf, of the olefin-based elasotomer is normally from 0.1 to 30 g/10 min and preferably from 0.5 to 20 g/10 min from the viewpoint of impact strength.

It is possible to prepare the olefin-based elastomer by polymerizing ethylene and at least one kind of α-olefin having from 4 to 20 carbon atoms in the presence of a known polymerization catalyst by using a known polymerization method. The known polymerization catalyst includes, for example, Ziegler-Natta catalyst systems composed, for example, of a vanadium compound, an organoaluminum compound and a halogenated ester compound, catalyst systems comprising a combination of an alumoxane or a boron compound and a metallocene compound in which a group with at least one cyclopentadienyl anion backbone is coordinated to a titanium atom, a zirconium atom or a hafnium atom, which are so-called metallocene catalyst systems.

The known polymerization method includes, for example, polymerization carried out in an inert organic solvent such as saturated hydrocarbon and polymerization carried out in the absence of solvent.

The vinyl aromatic compound-containing elastomer as the elastomer (D) refers to an elastomer which is a polymer having, as constituents of the main chain, structural units derived from vinyl aromatic compounds. Specifically, the vinyl aromatic compound-containing elastomer includes, for example, a block copolymer comprising a vinyl aromatic compound polymer block and a conjugated diene polymer block and a block polymer resulting from hydrogen addition to part or all of the double bonds of the conjugated diene portions of the aforesaid block copolymer. Block polymers resulting from hydrogen addition to 80% or more of the double bonds of the diene portions of the block copolymer are preferable. Block polymers resulting from hydrogen addition to 85% or more of the double bonds of the diene portions of the block copolymer are more preferable. In the present invention, the term "vinyl aromatic compound" refers to an aromatic compound having an aromatic nucleus to which a vinyl group is attached and a typical example thereof is styrene. The "vinyl group" used herein includes not only an non-substituted vinyl group ($-CH=CH_2$) but also substituted vinyl groups formed from non-substituted vinyl groups with one or more hydrogen atoms replaced by substituents (e.g. alkyl group and halogen atom). The aromatic nucleus, which includes an aromatic hydrocarbon nucleus such as benzene nucleus, naphthalene nucleus and anthracene nucleus and a heteroaromatic nucleus such as pyridine nucleus, is typically a benzene nucleus. In the present invention, a 'structural unit derived from a vinyl aromatic compound is sometimes referred to as a "vinyl aromatic compound".

Regarding the molecular weight distribution of the vinyl aromatic compound-containing elastomer, the Q value defined by use of a weight average molecular weight (Mw) and a number average molecular weight (Mn) measured by GPC (gel permeation chromatography), namely Mw/Mn, is preferably 2.5 or less and more preferably 2.3 or less. The Q value is normally not less than 1.0, and preferably not less than 1.02.

The average content of the vinyl aromatic compound contained in the vinyl aromatic compound-containing elastomer is preferably from 10 to 20% by weight, and more preferably from 12 to 19% by weight.

The MFR, measured at a temperature of 230° C. and a load of 2.16 kgf per JIS K-6758, of the vinyl aromatic compound-containing elastomer is preferably from 1 to 15 g/10 min, and more preferably from 2 to 13 g/10 min.

Examples of the vinyl aromatic compound-containing elastomer include block copolymers such as styrene-ethylene-butene-styrene rubber (SEBS), styrene-ethylene-propylene-styrene rubber (SEPS), styrene-butadiene rubber (SBR), styrene-butadiene-styrene rubber (SBS) and styrene-isoprene-styrene rubber (SIS) and block copolymers resulting from hydrogenation of the aforesaid rubbers.

Rubbers obtained by allowing an olefin-based copolymer rubber such as ethylene-propylene-nonconjugated diene rubber (EPDM) to react with a vinyl aromatic compound such as styrene are also used advantageously. Two or more kinds of vinyl aromatic compound-containing elastomers may be used together.

It is possible to produce the vinyl aromatic compound-containing elastomer by a method including bonding a vinyl aromatic compound to an olefin-based copolymer rubber or conjugated diene rubber by polymerization, reaction or the like.

The method for producing a propylene-based resin composition of the present invention is a method comprising:

a first step of producing a first resin composition (MB) by melt-kneading a first propylene polymer (A-I) and a fibrous inorganic filler (B) in a weight ratio of (A-I) to (B) of from 3/7 to 7/3; and a second step of producing a second resin composition by adding a second propylene polymer (A-II), a non-fibrous inorganic filler (C) and an elastomer (D) selected from the group consisting of olefin-based elastomer and vinyl aromatic compound-containing elastomer to the first resin composition (MB), followed by melt-kneading them.

In the first step, the weight ratio of the first propylene polymer (A-I) to the fibrous inorganic filler (B), that is to say, (A-I)/(B), is from 3/7 to 7/3 and preferably from 4/6 to 6/4.

If the ratio is less than 3/7, it may be impossible to knead the materials. If the ratio is over 7/3, the effect of improving the rigidity by (B) may be insufficient.

The method for melt-kneading the first propylene polymer (A-I) and the fibrous inorganic filler (B) may be a method in which the ingredients in solid state are mixed and then they are kneaded and a method in which the fibrous inorganic filler (B) is added to the first propylene polymer (A-I) in a molten state and then the resulting mixture is further melt-kneaded.

The apparatus to be used for the kneading includes a single screw extruder, a twin screw extruder, a Banbury mixer, a hot roll, and the like. Preferred are a single screw extruder and a twin screw extruder.

The temperature of the resin during the melt-kneading is normally from 170 to 250° C. and the melt-kneading time is normally from 30 seconds to 10 minutes.

It is preferable that the melt-kneading of the first propylene polymer (A-I) and the fibrous inorganic filler (B) be carried out so that the fibrous inorganic filler (B) is broken as less as possible. For example, a powdery propylene polymer is used as the first propylene polymer (A-I). A method is very advantageous wherein in the first step a lubricant (E) is further incorporated in an amount of from 0.3 to 3 parts by weight based on 100 parts by weight in total of the first propylene polymer (A-I) and the fibrous inorganic filler (B), and the melt-kneading is carried out in a kneading machine having a screw with a ratio of the screw length (L) to the screw diameter (D), L/D, of from 10 to 25. The L/D ratio of the screw is preferably from 15 to 25.

Examples of the lubricant (E) include silane compounds, polyolefin wax and fatty acid amides. Preferred are fatty acid amides, especially fatty acid amides having from 6 to 22 carbon atoms.

Examples of the fatty acid amides include lauramide, stearamide, oleamide, behenamide and erucamide. Preferred is erucamide.

The second step is a step of producing a second resin composition by adding a second propylene polymer (A-II), a non-fibrous inorganic filler (C) and an elastomer (D) selected from the group consisting of olefin-based elastomer and vinyl aromatic compound-containing elastomer to the first resin composition (MB) obtained in the first step and then melt-kneading them.

The apparatus to be used for the melt-kneading in the second step includes a single screw extruder, a twin screw extruder, a Banbury mixer, a hot roll, and the like. The temperature of the resin during the melt-kneading in the second step is normally from 170 to 250° C. and the melt-kneading time is normally from 1 to 20 minutes.

The first step and the second step may be carried out continuously in a single extruder. Alternatively, it is also permissive that the first resin composition (MB) is pelletized once to form pellets of the first resin composition (MB) in the first step and then the second step is carried out using the pellets obtained in the first step.

When the first resin composition (MB) is produced in the form of pellets in the first step and the resulting pellets are used in the second step, the pellets of the first resin composition (MB) obtained in the first step, the second propylene polymer (A-II), the non-fibrous inorganic filler (C) and the elastomer (D) may either be mixed simultaneously and then melt-kneaded or be mixed separately and then melt-kneaded.

The method for mixing the ingredients separately and then melt-kneading include, for example, the following methods (1) through (4).

(1) A method which comprises melt-kneading the second propylene polymer (A-II), the non-fibrous inorganic filler (C) and the elastomer (D), followed by adding pellets of the first resin composition (MB) obtained in the first step, and melt-kneading.

(2) A method which comprises melt-kneading pellets of the first resin composition (MB) obtained in the first step, the second propylene polymer (A-II) and the non-fibrous inorganic filler (C), followed by adding the elastomer (D), and melt-kneading.

(3) A method which comprises melt-kneading pellets of the first resin composition (MB) obtained in the first step, the second propylene polymer (A-II) and the elastomer (D), followed by adding the non-fibrous inorganic filler (C), and melt-kneading.

(4) A method which comprises melt-kneading the second propylene polymer (A-II) with the elastomer (D) in a high concentration to form a masterbatch, followed by adding pellets of the first resin composition (MB) obtained in the first step and the non-fibrous inorganic filler (C), and melt-kneading.

In one preferable embodiment of the method for producing a propylene resin composition of the present invention, the second propylene resin (A-II) in an amount of from 20 to 85% by weight, the non-fibrous inorganic filler (C) in an amount of from 5 to 20% by weight and the elastomer (D) in an amount of from 5 to 30% by weight are added to the first resin composition (MB) in an amount of from 5 to 30% by weight in the second step, where the total amount of the materials (A-II), (C), (D) and (MB) is adjusted to 100% by weight. By such a method, it is possible to obtain a resin composition superior in rigidity and impact strength.

More preferably, the amount of the first resin composition (MB) used is from 10 to 20% by weight, the amount of the second propylene polymer (A-II) used is from 53 to 75% by weight, the amount of the non-fibrous inorganic filler (C) used is from 5 to 12% by weight, and the amount of the elastomer (D) used is from 10 to 15% by weight.

The content of the fibrous inorganic filler (B), originating in the first resin composition (MB), contained in the second resin composition obtained in the second step is preferably from 5 to 12% by weight.

The propylene resin composition of the present invention is a propylene-based resin composition obtained by use of the method described above.

To the polypropylene-based resin composition of the present invention may be incorporated, as required, additives such as an antioxidant, an ultraviolet absorber, a pigment, an anti-static agent, a cupper inhibitor, a flame retardant, a lubricant, a neutralizing agent, a foaming agent, a plasticizer, a nucleating agent, an anti-foaming agent and a crosslinking agent.

The injection-molded article of the present invention is one obtained by known injection molding of the polypropylene resin composition of the present invention.

Applications of the injection-molded article of the present invention include automotive components, components of electric or electronic products and constructive components. Preferred are automotive components.

EXAMPLES

The present invention is illustrated by the following examples and comparative examples. The present invention, however, is not restricted to the examples.

The methods for measuring physical properties used in Examples and Comparative Examples are shown below.

(1) Melt Flow Rate (MFR, Unit: g/10 Min)

Melt flow-rates of polymer materials were measured according to the method provided in JIS K-6758. The measurements were carried out at a temperature of 230° C. and a load of 2.16 kg, unless otherwise stated.

(2) Flexural Modulus (FM, Unit: MPa)

Flexural moduli of polymer materials were measured according to the method provided in JISK-7203. The measurements were carried out using injection-molded specimen (thickness: 6.4 mm; span length: 100 mm) under a load speed of 30 mm/min at a temperature of 23° C. The conditions of the injection molding are described later.

(3) IZOD Impact Strength (Unit: $KJ/m^2$)

IZOD impact strengths of polymer materials were measured according to the method provided in JISK-7110. The measurements were carried out using injection-molded specimens (thickness: 3.2 mm; with notch) at temperature of 23° C. The conditions of the injection molding are described later.

(4) Ethylene Content (Unit: % by weight)

Unless otherwise stated, ethylene contents of polymeric materials were measured by the following method.

In each measurement, a press sheet of a polymer material was measured for its infrared absorption spectrum and the absorbances of characteristic absorptions of methyl groups (—CH$_3$) and methylene groups (—CH$_2$—) were determined. The ethylene content in the polymer material was determined by the working curve method using the absorbances.

(5) Intrinsic Viscosity ([η], Unit: dl/g)

Unless otherwise stated, intrinsic viscosities of polymeric materials were measured by the following method.

Reduced viscosities were measured at three points of concentrations of 0.1, 0.2 and 0.5 g/dl using a Ubbelohde type viscometer. The intrinsic viscosity was calculated by a calculation method described in page 491 of "Kobunshi Yoeki (Polymer Solution), Kobunshi Jikkengaku (Polymer Experiment Study) 11" (published by Kyoritsu Shuppan Co. Ltd., 1982), namely, by an extrapolation method in which reduced viscosities are plotted against concentrations and the concentration is extrapolated in zero. Regarding propylene polymers, the intrinsic viscosity was measured at a temperature of 135° C. using tetralin as a solvent.

(6) Molecular Weight Distribution (Q Value)

Molecular weight distributions of polymer materials were determined by gel permeation chromatography (GPC) under the conditions provided below.

GPC: Model 150 C manufactured by Waters

Column: Shodex 80 MA manufactured by Showa Denko, two columns

Amount of sample injected: 300 μl (sample concentration: 0.2 wt %)

Flow rate: 1 ml/min

Column temperature: 135° C.

Solvent: o-Dichlorobenzene

Using a standard polystyrene manufactured by Tosoh Corp., a working curve of eluted volume vs. molecular weight was produced. Using the working curve, the weight average molecular weight (Mw) and the number average molecular weight (Mn) of the sample tested were determined on the basis of polystyrene calibration standards. Then, a Q value, which is a ratio of the weight average molecular weight to the number average molecular weight, Mw/Mn, was calculated, which was used as an index of molecular weight distribution.

(7) Isotactic Pentad Fraction (Unit: %)

The isotactic pentad fraction of a propylene-based polymer was measured by the method reported in A. Zambelli et al., Macromolecules, 6, 925 (1973). Namely, determined was a fraction of isotactic chains in the form of pentad unit in a polypropylene molecule chain, in other words, a fraction of propylene monomer units existing in the center of a chain in which five propylene monomer units are meso-bonded measured by use of $^{13}$C-NMR. The assignment of NMR absorption peaks was conducted based on the disclosure of Macromolecules, 8, 687 (1975). Specifically, the isotactic pentad fraction was measured as an area fraction of mmmm peaks in all the absorption peaks in the methyl carbon region of a $^{13}$C-NMR spectrum. According to this method, the isotactic pentad fraction of an NPL standard substance, CRM No. M19-14 Polypropylene PP/MWD/2 available from NATIONAL PHYSICAL LABORATORY, G.B. was measured to be 0.944.

(8)-(10): Analysis of Propylene-Ethylene Block Copolymers Composed of a Propylene Homopolymer Portion and a Propylene-Ethylene Random Copolymer Portion (8) Weight Ratio of the Propylene-Ethylene Random Copolymer Portion to the Propylene-Ethylene Block Copolymer (X, % by Weight)

In a propylene-ethylene block copolymer, the weight ratio, X (% by weight), of the propylene-ethylene random copolymer portion to the propylene-ethylene block copolymer was determined according to the following equation after the measurement of the amounts of heat of crystal fusion of the propylene homopolymer portion and the propylene-ethylene block copolymer.

$$X = 1 - (\Delta Hf)T/(\Delta Hf)P$$

(ΔHf)T: Amount of heat of fusion of the propylene-ethylene block copolymer (cal/g)

(ΔHf)P: Amount of heat of fusion of propylene homopolymer portion (cal/g)

(9) Ethylene Content in the Propylene-Ethylene Random Copolymer Portion (Unit: % by Weight)

The ethylene content in the propylene-ethylene random copolymer portion of the propylene-ethylene block copolymer was determined by calculation according to the following equation after the measurement of the ethylene content (% by weight) of the propylene-ethylene block copolymer by the infrared absorption spectrum method.

$$(C2')EP = (C2')T/X$$

(C2')T: Ethylene content of the propylene-ethylene block copolymer (% by weight)

(C2')EP: Ethylene content of the propylene-ethylene random copolymer portion (% by weight)

(10) Intrinsic Viscosity ([η]EP, Unit: dl/g) of the Propylene-Ethylene Random Copolymer Portion of the Propylene-Ethylene Block Copolymer The intrinsic viscosity, [η]EP, of the propylene-ethylene random copolymer portion in the propylene-ethylene block copolymer was determined by calculation according to the following equation after the measurement of intrinsic viscosities of the propylene homopolymer portion and the propylene-ethylene block copolymer.

$$[\eta]EP = [\eta]T/X - (1/X - 1)[\eta]P$$

[η]P: Intrinsic viscosity of the propylene homopolymer portion (dl/g)

[ƒ]T: Intrinsic viscosity of the propylene-ethylene block copolymer (dl/g)

The intrinsic viscosity, [η]P, of the propylene homopolymer portion, which is the first segment of the propylene-ethylene block copolymer, was determined using a part of the propylene homopolymer removed from a polymerization reactor after the production of the propylene homopolymer portion during the production of the propylene-ethylene block copolymer.

(11) Evaluation of the Appearance of Molded Articles

The appearance of a flat plate with a size 80 mm×240 mm×3 mm obtained by the injection molding method described later was observed visually. The quality of the appearance was judged on whether hard spots were present or not. When no hard spots were found in the specimen, the appearance was judged to be good and indicated by a symbol "o", whereas when a hard spot was found in the specimen, the appearance was judged to be poor and indicated by a symbol "x".

Molded articles for appearance evaluation, those for flexural modulus measurement and those for IZOD impact strength measurement were produced under the injection molding conditions given below.

That is to say, propylene-based resin compositions were dried in a hot air dryer at 120° C. for 2 hours and then injection molded using an injection molding machine manufactured by Toshiba Machine Co., Ltd. Model IS150E-V fitted with a multicavity mold at a molding temperature of 180° C., a mold cooling temperature of 50° C., an injection time of 15 sec. and a cooling time of 30 sec.

The samples used in the examples and comparative examples are shown below.

Propylene Polymer (A-a) Propylene Homopolymer (1) Propylene Homopolymer (A-1)

A powdery propylene homopolymer having a molecular weight distribution (Q value) of 4.1, an intrinsic viscosity ([η]P) of 0.80 dl/g, an isotactic pentad fraction of 0.99 and an MFR (230° C.) of 300 g/10 min.

(2) Propylene Homopolymer (A-2)

A powdery propylene homopolymer having a molecular weight distribution (Q value) of 4.0, an intrinsic viscosity ([η]P) of 1.45 dl/g, an isotactic pentad fraction of 0.98 and an MFR (230° C.) of 20 g/10 min.

(A-b) Propylene-Ethylene Block Copolymer (1) Propylene-Ethylene Block Copolymer (BC-1)

AZ564 manufactured by Sumitomo Chemical Co., Ltd., which is a propylene-ethylene block copolymer composed of a propylene homopolymer portion (first segment) and a propylene-ethylene random copolymer portion (second segment). AZ564 has an MFR (230° C.) of 30 g/10 min.

The first segment has a Q value of 4.0, an intrinsic viscosity ([η]P) of 1.05 dl/g and an isotactic pentad fraction of 0.97. The second segment has an intrinsic viscosity ([η]EP) of 4.0 dl/g, a weight ratio to the propylene-ethylene block copolymer (BC-1) of 16% by weight and an ethylene content of 45% by weight.

(2) Propylene-Ethylene Block Copolymer (BC-2)

AS171G manufactured by Sumitomo Chemical Co., Ltd., which is a propylene-ethylene block copolymer composed of a propylene homopolymer portion (first segment) and a propylene-ethylene random copolymer portion (second segment). AS171G has an MFR (230° C.) of 0.9 g/10 min.

The first segment has a Q value of 4.0, an intrinsic viscosity ([η]P) of 2.3 dl/g and an isotactic pentad fraction of 0.97. The second segment has an intrinsic viscosity ([η]EP) of 4.5 dl/g, a weight ratio to the propylene-ethylene block copolymer (BC-2) of 15.6% by weight and an ethylene content of 37.5% by weight.

(3) Propylene-Ethylene Block Copolymer (BC-3)

A propylene-ethylene block copolymer composed of a propylene homopolymer portion (first segment) and a propylene-ethylene random copolymer portion (second segment). The copolymer has an MFR (230° C.) of 80 g/10 min.

The first segment has a Q value of 4.0, an intrinsic viscosity ([η]P) of 0.81 dl/g and an isotactic pentad fraction of 0.99. The second segment has an intrinsic viscosity ([η]EP) of 6.1 dl/g, a weight ratio to the propylene-ethylene block copolymer (BC-3) of 12.4% by weight and an ethylene content of 31.5% by weight.

(B) Fibrous Inorganic Filler

Fibrous magnesium oxysulfate (MOS-HIGE manufactured by Ube Material Industries, Ltd.), which has an average fiber diameter of 0.5 μm, an average fiber length of 10 μm and an average aspect ratio of 20.

(C) Non-Fibrous Inorganic Filler

Talc (MWHST manufactured by Hayashi Kasei Co., Ltd.), which has an average particle diameter of 2.7 μm.

(D) Elastomer (1) Olefin-Based Elastomer (D-1)

Ethylene-1-octene copolymer rubber (ENGAGE 8200 manufactured by Dupont Dow Elastomers), which has a density of 0.870 g/cm$^3$ and an MFR(190° C.) of 5 g/10 min.

(2) Olefin-Based Elastomer (D-2)

Ethylene-1-octene copolymer rubber (ENGAGE 8100 manufactured by Dupont Dow Elastomers), which has a density of 0.870 g/cm$^3$ and an MFR(190° C.) of 1 g/10 min.

(3) Olefin-Based Elastomer (D-3)

Ethylene-1-butene copolymer rubber (EXCELLEN FX CX5515 manufactured by Sumitomo Chemical Co., Ltd.), which has a density of 0.870 g/cm$^3$ and an MFR(190° C.) of 6 g/10 min.

(4) Olefin-Based Elastomer (D-4)

Ethylene-1-butene copolymer rubber (EXCELEN FX CX5505 manufactured by Sumitomo Chemical Co., Ltd.), which has a density of 0.870 g/cm$^3$ and an MFR(190° C.) of 15 g/10 min.

(5) Olefin-Based Elastomer (D-5)

Ethylene-1-butene copolymer rubber (TAFMER A1050 manufactured by Mitsui Chemicals, Inc.), which has a density of 0.86 g/cm$^3$ and an MFR(190° C.) of 1 g/10 min.

(6) Olefin-Based Elastomer (D-6)

Ethylene-1-butene copolymer rubber (TAFMER A6050 manufactured by Mitsui Chemicals, Inc.), which has a density of 0.86 g/cm$^3$ and an MFR(190° C.) of 6 g/10 min.

(7) Vinyl Aromatic Compound-Containing Elastomer (D-7)

Styrene-ethylene-butene-styrene rubber (SEBS) (TUFTEC H1062 manufactured by Asahi Kasei Corp.), which has a density of 0.89 g/cm$^3$, an MFR(230° C.) of 4.5 g/10 min and a styrene content of 18% by weight.

(E) Lubricant

Erucamide (News manufactured by Nippon Fine Chemical Co., Ltd.)

Examples 1, 2

First Step:

A propylene homopolymer (A-1 or A-2), a fibrous inorganic filler (B) and a lubricant (E) were fed from scales into a twin screw extruder (4FCM manufactured by Kobe Steel, Ltd.) so that a composition given in Table 1 was established, and then the materials were melt-kneaded. The twin screw extruder had screws of full-flight form with an L/D ratio of 18.5 rotated at a screw speed of 700 rpm. Following the melt-kneading in the twin screw extruder, the mixture was pelletized through a single screw extruder with a screw diameter of 120 mm manufactured by Osaka Seiki Co. to produce pellets of a first resin composition (MB-1 or MB-2).

TABLE 1

| | Composition (part by weight) | | | | Single Screw Extruder Operation Conditions | |
|---|---|---|---|---|---|---|
| | A-1 | A-2 | B | E | Screw speed (rpm) | Extrusion output (kg/h) |
| MB-1 | 50 | 0 | 50 | 1 | 36 | 180 |
| MB-2 | 0 | 50 | 50 | 1 | 30 | 100 |

Second Step:

Propylene-ethylene block copolymers (BC-1 and BC-2), elastomers (D-1 and D-3), an non-fibrous inorganic filler (C) and the first resin composition prepared in the first step (MB-1 or MB-2) were fed into a tumbler so that the composition given in Table 2 was established, and the materials were preliminarily mixed uniformly. The resulting preliminary mixture was transferred to a twin screw extruder (TEX44SS- 31.5BW-2V manufactured by The Japan Steel Works, Ltd.) and then melt-kneaded at an extrusion rate of 30 kg/hr, a screw speed of 350 rpm under vent suction to produce a second resin composition. The resulting resin compositions were measured for their MFR. In addition, injection molded articles were produced and evaluated. The results of the measurement and evaluation are shown in Table 3.

Comparative Example 1

Propylene-ethylene block copolymers (BC-1 and BC-2), elastomers (D-1 and D-3), an non-fibrous inorganic filler (C), a propylene homopolymer (A-1) and a fibrous inorganic filler (B) were fed into a tumbler so that the composition given in Table 2 was established, and the materials were preliminarily mixed uniformly. The resulting preliminary mixture was transferred to a twin screw extruder (TEX44SS-31.5BW-2V manufactured by The Japan Steel Works, Ltd.) and then melt-kneaded at an extrusion rate of 30 kg/hr, a screw speed of 350 rpm under vent suction to produce a second resin composition. The resulting resin compositions were measure for their MFR. In addition, injection molded articles were produced and evaluated. The results of the measurement and evaluation are shown in Table 3.

TABLE 2

| | Composition (% by weight) | | | | | | | |
|---|---|---|---|---|---|---|---|---|
| | BC-1 | BC-2 | C | D-1 | D-3 | MB-1 | MB-2 | A-1 | B |
| Example 1 | 53.5 | 11 | 7.5 | 5 | 7 | 16 | 0 | 0 | 0 |
| Example 2 | 53.5 | 11 | 7.5 | 5 | 7 | 0 | 16 | 0 | 0 |
| Comparative Example 1 | 55.5 | 9 | 7.5 | 5 | 7 | 0 | 0 | 8 | 8 |

TABLE 3

| | MFR (g/10 min) | Flexural modulus (MPa) | IZOD impact strength (J/m) | Appearance of molded articles |
|---|---|---|---|---|
| Example 1 | 20 | 2610 | 388 | ○ |
| Example 2 | 15 | 2900 | 356 | ○ |
| Comparative Example 1 | 19 | 2470 | 390 | ○ |

Example 3

Propylene-ethylene block copolymers (BC-1 and BC-2), elastomers (D-2 and D-3), the first resin composition (MB-1) obtained in the first step of Example 1 and a non-fibrous inorganic filler (C) were fed from scales to a twin screw extruder (SCM90 manufactured by Nippon Placon Co., Ltd.; screw L/D=32) so that a composition given in Table 4 was established. The materials were then kneaded at an extrusion rate of 200 kg/hr, a screw speed of 230 rpm under vent suction to produce a second resin composition. All the materials were fed into the extruder through a feed port (1) provided at the most upstream portion of the screw of the extruder. The resulting resin composition was measured for its MFR. In addition, injection molded articles were produced and evaluated. The results of the measurement and evaluation are shown in Table 5.

Example 4

The operations of Example 3 were repeated except feeding the first resin composition (MB-1) into the extruder through a feed port (2) provided at a downstream portion of the screw (the position with a screw L/D of 16), yielding a second resin composition. The resulting resin composition was measured for its MFR. In addition, injection molded articles were produced and evaluated. The results of the measurement and evaluation are shown in Table 5.

Comparative Example 2

A propylene homopolymer (A-1), propylene-ethylene block copolymers (BC-1 and BC-2), fibrous inorganic filler (B), elastomers (D-2 and D-3) and a non-fibrous inorganic filler (C) were fed from scales to a twin screw extruder (SCM90 manufactured by Nippon Placon Co., Ltd.; screw L/D=32) so that a composition given in Table 4 was established. The materials were then kneaded at an extrusion rate of 200 kg/hr, a screw speed of 230 rpm under vent suction to produce a resin composition. All the materials were fed into the extruder through a feed port (1) provided at the most upstream portion of the screw of the extruder. The resulting resin composition was measured for its MFR. In addition, injection molded articles were produced and evaluated. The results of the measurement and evaluation are shown in Table 5.

Comparative Example 3

Propylene-ethylene block copolymers (BC-1 and BC-2), elastomers (D-2 and D-3), a fibrous inorganic filler (B) and a non-fibrous inorganic filler (C) were fed from scales to a twin screw extruder (SCM90 manufactured by Nippon Placon Co., Ltd.; screw L/D=32) so that a composition given in Table 6 was established. The materials were then kneaded at an extrusion rate of 200 kg/hr, a screw speed of 230 rpm under vent suction to produce a resin composition. All the materials were fed into the extruder through a feed port (1) provided at the most upstream portion of the screw of the extruder. The resulting resin composition was measured for its MFR. In addition, injection molded articles were produced and evaluated. The results of the measurement and evaluation are shown in Table 7.

Comparative Example 4

The operations of Comparative Example 3 were repeated except feeding the fibrous inorganic filler (B) into the extruder through a feed port (2) provided at a downstream portion of the screw (the position with a screw L/D of 16), yielding a resin composition. The resulting resin composition was measured for its MFR. In addition, injection molded articles were produced and evaluated. The results of the measurement and evaluation are shown in Table 7.

TABLE 4

| | Composition (% by weight) | | | | | | | | Component (C) feed position |
|---|---|---|---|---|---|---|---|---|---|
| | BC-1 | BC-2 | C | D-2 | D-3 | MB-1 | A-1 | B | |
| Example 3 | 60.5 | 4 | 8 | 6.5 | 7 | 14 | 0 | 0 | Feed port (1) |
| Comparative Example 2 | 60.5 | 4 | 8 | 6.5 | 7 | 0 | 7 | 7 | Feed port (1) |
| Example 4 | 60.5 | 4 | 8 | 6.5 | 7 | 14 | 0 | 0 | Feed port (2) |

TABLE 5

|  | MFR (g/10 min) | Flexural Modulus (MPa) | IZOD Impact Strength (J/m) | Appearance of Molded Articles |
|---|---|---|---|---|
| Example 3 | 23 | 2600 | 340 | ○ |
| Comparative Example 2 | 26 | 2360 | 185 | ○ |
| Example 4 | 23 | 2450 | 390 | ○ |

TABLE 6

|  | Composition (% by weight) |  |  |  |  | Component (C) |
|---|---|---|---|---|---|---|
|  | BC-1 | BC-2 | C | D-4 | B | Feed Position |
| Comparative Example 3 | 62 | 10 | 7.5 | 12.5 | 8 | Feed port (1) |
| Comparative Example 4 | 62 | 10 | 7.5 | 12.5 | 8 | Feed port (2) |

TABLE 7

|  | MFR (g/10 min) | Flexural Modulus (MPa) | IZOD Impact Strength (J/m) | Appearance of Molded Articles |
|---|---|---|---|---|
| Comparative Example 3 | 16 | 2200 | 440 | ○ |
| Comparative Example 4 | 16 | 2940 | 200 | X |

Examples 1, 2 are superior in balance between rigidity and impact strength of molded articles to Comparative Example 1.

Examples 3, 4 are superior in balance between rigidity and impact strength of molded articles to Comparative Example 2.

In Comparative Example 3 where a propylene polymer was not melt-kneaded with fibrous inorganic filler in advance and all materials were fed into an extruder simultaneously, a molded article had a low rigidity.

In Comparative Example 4 where a propylene polymer was not melt-kneaded with fibrous inorganic filler in advance and a fibrous inorganic filler was fed to a twin screw extruder at its downstream portion after other materials were fed thereto, resulting molded articles had a high rigidity, but they were poor in surface appearance.

Example 5

Step 2:

A propylene homopolymer (A-1), a propylene-ethylene block copolymer (BC-3), elastomers (D-5, D-6 and D-7), the first resin composition prepared in the first step (MB-1) and a non-fibrous inorganic filler (C) were fed into a tumbler so that the composition given in Table 8 was established, and the materials were preliminarily mixed uniformly. The resulting preliminary mixture was transferred to a twin screw extruder (TEX44SS-31.5BW-2V manufactured by The Japan Steel Works, Ltd.) and then melt-kneaded at an extrusion rate of 30 kg/hr, a screw speed of 350 rpm under vent suction to produce a second resin composition. The resulting resin composition was measured for its MFR. In addition, injection molded articles were produced and evaluated. The results of the measurement and evaluation are shown in Table 9.

Comparative Example 5

A propylene homopolymer (A-1), a propylene-ethylene block copolymer (BC-3), elastomers (D-5, D-6 and D-7), an non-fibrous inorganic filler (C) and a fibrous inorganic filler (B) were fed into a tumbler so that the composition given in Table 8 was established, and the materials were preliminarily mixed uniformly. The resulting preliminary mixture was transferred to a twin screw extruder (TEX44SS-31.5BW-2V manufactured by The Japan Steel Works, Ltd.) and then melt-kneaded at an extrusion rate of 30 kg/hr, a screw speed of 350 rpm under vent suction to produce a second resin composition. The resulting resin composition was measured for its MFR. In addition, injection molded articles were produced and evaluated. The results of the measurement and evaluation are shown in Table 9.

TABLE 8

|  | Composition (% by weight) | | | | | | | |
|---|---|---|---|---|---|---|---|---|
|  | A-1 | BC-3 | C | D-5 | D-6 | D-7 | MB-1 | B |
| Example 5 | 12 | 30 | 10 | 17 | 5 | 6 | 20 | 0 |
| Comparative Example 5 | 22 | 30 | 10 | 22 | 0 | 6 | 0 | 10 |

TABLE 9

|  | MFR (g/10 min) | Flexural Modulus (MPa) | IZOD Impact Strength (J/m) | Appearance of Molded Articles |
|---|---|---|---|---|
| Example 5 | 65 | 2250 | 610 | ○ |
| Comparative Example 5 | 59 | 2100 | 640 | ○ |

Examples 5 is superior in balance between rigidity and impact strength of molded articles to Comparative Example 5.

What is claimed is:

1. A method for producing a propylene-based resin composition comprising:
    a first step of producing a first resin composition (MB) by melt-kneading a first propylene polymer (A-I) which is a powdery propylene polymer and a fibrous inorganic filler (B) in a weight ratio of (A-I) to (B) of from 3/7 to 7/3; and
    a second step of producing a second resin composition by adding a second propylene polymer (A-II), a non-fibrous inorganic filler (C) and an elastomer (D) selected from the group consisting of copolymer elastomer composed of ethylene and at least one kind of α-olefin having from 4 to 20 carbon atoms, styrene-ethylene-butene-styrene block copolymer rubber, styrene-butadiene block copolymer rubber, styrene-butadiene-styrene block copolymer rubber, styrene-isoprene-styrene block copolymer rubber and block copolymers resulting from hydrogenation of these block copolymer rubbers to the first resin composition (MB), followed by melt-kneading the second propylene polymer (A-II), the non-fibrous inorganic filler (C), the elastomer (D) and the first resin composition (MB).

2. The method according to claim 1 wherein in the second step the second propylene resin (A-II) in an amount of from 20 to 85% by weight, the non-fibrous inorganic filler (C) in an amount of from 5 to 20% by weight and the elastomer (D) in an amount of from 5 to 30% by weight are added to the first resin composition (MB) in an amount of from 5 to 30% by weight, where the total amount of the materials (A-II), (C), (D) and (MB) is adjusted to 100% by weight.

3. The method according to claim 1 wherein the first step further comprises an operation of pelletizing the first resin composition (MB) to form pellets of the first resin composition (MB) and wherein the pellets are used in the second step.

4. The method according to claim 1 wherein the fibrous inorganic filler (B) is fibrous magnesium oxysulfate having an average fiber diameter of from 0.2 to 1.5 μm, an average fiber length of from 5 to 20 μm and an aspect ratio of from 10 to 30.

5. The method according to claim 4 wherein the non-fibrous inorganic filler (C) is talc.

6. The method according to claim 1 wherein in the first step a lubricant (E) is further incorporated in an amount of from 0.3 to 3 parts by weight based on 100 parts by weight in total of the first propylene polymer (A-I) and the fibrous inorganic filler (B), and the melt-kneading is carried out in a kneading machine having a screw with a ratio of the screw length (L) to the screw diameter (D), L/D, of from 10 to 25.

7. The method according to claim 1 wherein the first propylene polymer (A-I) has an MFR, measured at a temperature of 230° C. and a load of 2.16 kgf, of from 15 to 500 g/10 min.

* * * * *